United States Patent
Allbright et al.

(10) Patent No.: US 11,392,953 B2
(45) Date of Patent: *Jul. 19, 2022

(54) DATA ANALYSIS SYSTEMS AND METHODS FOR IDENTIFYING RECURRING PAYMENT PROGRAMS

(71) Applicant: MASTERCARD INTERNATIONAL INCORPORATED, Purchase, NY (US)

(72) Inventors: Joshua A. Allbright, Valley Park, MO (US); Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,060

(22) Filed: Aug. 31, 2020

(65) Prior Publication Data

US 2020/0402064 A1 Dec. 24, 2020

Related U.S. Application Data

(63) Continuation of application No. 15/813,501, filed on Nov. 15, 2017, now Pat. No. 10,776,789.

(51) Int. Cl.
*G06Q 20/40* (2012.01)
*G06F 17/18* (2006.01)
(Continued)

(52) U.S. Cl.
CPC ......... *G06Q 20/4016* (2013.01); *G06F 17/18* (2013.01); *G06Q 20/08* (2013.01);
(Continued)

(58) Field of Classification Search
CPC ........ G06Q 20/40; G06Q 20/08; G06Q 20/10; G06F 17/18
(Continued)

(56) References Cited

U.S. PATENT DOCUMENTS 7,650,314 B1   1/2010   Saunders
9,519,928 B2   12/2016  Calman et al.
(Continued)

FOREIGN PATENT DOCUMENTS

WO   2002097563 A2   12/2002

OTHER PUBLICATIONS

PCT International Search Report and Written Opinion, Application No. PCT/US2018/055591, dated Dec. 7, 2018, 12pps.

(Continued)

*Primary Examiner* — Robert R Niquette
(74) *Attorney, Agent, or Firm* — Armstrong Teasdale LLP

(57) ABSTRACT

An analytics computing system for analyzing payment transaction data to identify merchants having a recurring payment program is provided. The analytics computing system is configured to receive first payment transaction data for a plurality of transactions associated with a merchant, generate an actual transaction amount distribution, compare the actual transaction amount distribution to a stored model distribution, compare an angle distance to a predefined threshold value, and identify whether the merchant is a merchant performing recurring payment transactions. The analytics computing system is also configured to store that the merchant is a recurring payment merchant and alert an analyst that the merchant is a recurring payment merchant by transmitting an alert message to a user computing device in communication with the analytics computing device.

20 Claims, 7 Drawing Sheets

(51) Int. Cl.
*G06Q 20/08* (2012.01)
*G06Q 20/10* (2012.01)
*G06Q 20/24* (2012.01)
*G06Q 20/38* (2012.01)

(52) U.S. Cl.
CPC .......... *G06Q 20/085* (2013.01); *G06Q 20/10* (2013.01); *G06Q 20/24* (2013.01); *G06Q 20/389* (2013.01)

(58) Field of Classification Search
USPC ..................................................... 705/35–45
See application file for complete search history.

(56) References Cited

U.S. PATENT DOCUMENTS

| | | | | |
|---|---|---|---|---|
| 10,776,789 | B2* | 9/2020 | Allbright | G06Q 20/24 |
| 11,176,558 | B1* | 11/2021 | Cohn | G06Q 20/102 |
| 2008/0172264 | A1* | 7/2008 | Hoefelmeyer | G06Q 40/00 705/35 |
| 2009/0012896 | A1* | 1/2009 | Arnold | G06Q 30/06 705/1.1 |
| 2009/0099884 | A1* | 4/2009 | Hoefelmeyer | G06Q 10/0639 705/7.38 |
| 2014/0258099 | A1 | 9/2014 | Rosano et al. | |
| 2014/0279204 | A1 | 9/2014 | Roketenetz et al. | |
| 2014/0351126 | A1* | 11/2014 | Priebatsch | G06Q 20/20 705/44 |
| 2014/0359759 | A1* | 12/2014 | Fagan | G06F 21/00 726/22 |
| 2015/0081499 | A1 | 3/2015 | Caldwell | |
| 2015/0081531 | A1 | 3/2015 | Caldwell et al. | |
| 2015/0206252 | A1 | 7/2015 | Rephlo et al. | |
| 2017/0148020 | A1 | 5/2017 | Vienravee et al. | |
| 2017/0286952 | A1 | 10/2017 | Gerard et al. | |
| 2019/0147448 | A1* | 5/2019 | Allbright | G06Q 20/389 705/77 |

OTHER PUBLICATIONS

Collins, "Using Excel and Benford's Law to detect fraud," Journal of Accountancy, Apr. 1, 2017. https ://www . journalofaccountancy.com/issues/2017 /apr/excel-and-benfords-law-to-detect-fraud .html (Year: 2017).

Durtschi et al., "The Effective Use of Benford's Law to Assist in Detecting Fraud in Accounting Data," Journal of Forensic Accounting, vol. V, pp. 17-34, 2004. (Year: 2004).

Kellerman, "Evaluating the effectiveness of Benford's law as an investigative tool for forensic accountants," North-West University, May 2014. https://repository.nwu.ac.za/bitstream/handle/10394/11729/Kellerman_L.pdf?sequence= 1&isAllowed=y (Year: 2014).

Stalcup, "Benford's Law: How a Simple Misconception can Trip up a Fraudster and How a Savvy CFE Can Spot It," Fraud Magazine, Jan./Feb. 2010. https ://www.fraud-magazine.com/article .aspx?id = 203 (Year: 2010).

\* cited by examiner

DATA ANALYSIS SYSTEMS AND METHODS FOR IDENTIFYING RECURRING PAYMENT PROGRAMS

CROSS REFERENCE TO RELATED APPLICATIONS

This application is a continuation application of U.S. patent application Ser. No. 15/813,501, filed Nov. 15, 2017, entitled "DATA ANALYSIS SYSTEMS AND METHODS FOR IDENTIFYING RECURRING PAYMENT PROGRAMS", the disclosure of which is incorporated herein by reference in its entirety.

BACKGROUND

This disclosure relates generally to collecting and analyzing data to identify patterns, and more particularly, to network-based systems and methods for analyzing payment transaction data to identify merchants having a recurring payment program.

Computer systems are used to collect and analyze data. In some cases, these computer systems may recognize patterns within any data sets. These patterns may sometimes indicate steps being performed by a party associated with the data sets.

For example, consumers are oftentimes able to use a variety of methods to perform payment transactions to purchase goods and services, including, for example, online monthly subscription services. These methods include use of cash, plastic payment cards, smartphones, and other computing devices operated by users (also known as user computing devices) that are able to provide account data which is used to complete a purchase. In the case of account data being communicated for performing a transaction, a payment processor computing device processes the payment transactions over a processing network. In the case of online subscription services purchases or other purchases, users typically initiate these transactions while not at a merchant physical location (e.g., an online transaction initiated from home, such as to order goods from a merchant website). Such transactions are sometimes also referred to herein as card-not-present transactions (CNP), because a payment card is not physically presented at a merchant location. In these transactions, information regarding the payment card, including an account number and, in many instances, an expiration date for the payment card, are transmitted from a merchant, along with an indicator that the transaction is a CNP transaction.

An "account-on-file" transaction is a type of transaction in which the merchant stores information regarding the user's payment card in a database, then retrieves the stored payment card information and includes it in an authorization request message submitted when processing the transaction. One specific type of account-on-file transaction is a "recurring payment transaction," which a merchant initiates on a recurring basis for a particular user. In such recurring payment transactions, the merchant stores information regarding the user's payment card in a database, then retrieves the stored payment card information and includes it in each recurring authorization request message.

Another example, in addition to the online subscription services, is a gym membership. Rather than mailing a monthly check for membership with a gym, a user might choose to register a payment card, such as a credit card, a debit card, or a prepaid card, with the gym. Registering the payment card with the gym enables the gym to automatically charge the payment card for the monthly dues on a particular day each month. In some such systems, the merchant stores an account number, an expiration date, and/or other information associated with the payment card and/or user. Given the convenience of this payment model for both merchants and users, it finds use in many other scenarios where a user is a member of a club or subscriber of products or services. Accordingly, multiple merchants may have stored payment card information for the same user. Likewise, any given merchant may have stored payment card information for multiple users.

In addition to recurring payment transactions (e.g., recurring payment programs), merchants may also maintain account-on-file information to facilitate payment card transactions by repeat customers. For example, an online merchant may allow a shopper to create an online account and store account data corresponding to one or more methods of payment. When the shopper is ready to check out and complete a purchase, the shopper may simply select one of the stored payment methods as opposed to having to re-enter their payment card information.

A downside of storing payment card information, however, is that information regarding a payment card is subject to change. For example a user's payment card might expire, causing a new payment card to be issued with a new expiration date while the card number remains the same. In such instances, an authorization request message containing the outdated expiration date is denied by the issuer of the payment card. As a result, the merchant that originally submitted the authorization request is prevented from successfully obtaining payment until the merchant acquires the updated expiration date for the payment card. Due to wide adoption of the account-on-file payment model by merchants and users, it is understandably difficult for a user to update each merchant with new payment card expiration dates. Likewise, it reduces the benefits of the account-on-file payment model to require a merchant to inquire with each user for an updated payment card expiration date prior to submitting each payment authorization request.

In light of the foregoing, at least some known systems may provide merchants with updated user payment information to avoid such recurring payments being denied for stale information. However, to identify the merchants that regularly perform recurring payment transactions is very complex and time-consuming. Therefore, these merchants may not know about these known systems, which prevent these merchants from benefiting of the updating services provided by such known systems. Accordingly, a system that easily identifies merchants that perform recurring payment transactions is desirable.

BRIEF DESCRIPTION

In one aspect, an analytics computing system for analyzing payment transaction data to identify merchants having a recurring payment program is provided. The analytics computing system includes at least one analytics computing device that includes a processor communicatively coupled to a memory and is configured to receive first payment transaction data for a plurality of transactions associated with a merchant, wherein the first payment transaction data for the plurality of transactions includes a plurality of transaction amounts and a merchant identifier. The analytics computing device is also configured to generate an actual transaction amount distribution for the merchant using the transaction amounts from the first payment transaction data and compare the actual transaction amount distribution to a stored model distribution including computing an angle distance between the actual transaction amount distribution and the stored model distribution, wherein the stored model distribution represents a transaction amount distribution for a model merchant having products priced at numerous different transaction amounts. The analytics computing device is further configured to compare the angle distance to a predefined threshold value, identify whether the merchant is a recurring payment merchant that performs recurring payment transactions based upon the computed angle distance and the threshold value, store within a database that the merchant is a recurring payment merchant if so determine, and alert an analyst that the merchant is a recurring payment merchant by transmitting an alert message to a user computing device in communication with the analytics computing device.

In another aspect, a computer-implemented method for analyzing payment transaction data to identify merchants having a recurring payment program is provided. The method includes receiving first payment transaction data for a plurality of transactions associated with a merchant, wherein the first payment transaction data for the plurality of transactions includes a plurality of transaction amounts and a merchant identifier. The method also includes generating an actual transaction amount distribution for the merchant using the transaction amounts from the first payment transaction data and comparing the actual transaction amount distribution to a stored model distribution including computing an angle distance between the actual transaction amount distribution and the stored model distribution, wherein the stored model distribution represents a transaction amount distribution for a model merchant having products priced at numerous different transaction amounts. The method further includes comparing the angle distance to a predefined threshold value, identifying whether the merchant is a recurring payment merchant that performs recurring payment transactions based upon the computed angle distance and the threshold value, storing within a database that the merchant is a recurring payment merchant if so determined, and alerting an analyst that the merchant is a recurring payment merchant by transmitting an alert message to a user computing device in communication with the analytics computing device.

In yet another aspect, a non-transitory computer readable medium that includes executable instructions for analyzing payment transaction data to identify merchants having a recurring payment program is provided. When the computer executable instructions are executed by an analytics computing device that includes at least one processor in communication with at least one memory device, the computer executable instructions cause the analytics computing device to receive first payment transaction data for a plurality of transactions associated with a merchant, wherein the first payment transaction data for the plurality of transactions includes a plurality of transaction amounts and a merchant identifier. The computer executable instructions also cause the analytics computing device to generate an actual transaction amount distribution for the merchant using the transaction amounts from the first payment transaction data and compare the actual transaction amount distribution to a stored model distribution including computing an angle distance between the actual transaction amount distribution and the stored model distribution, wherein the stored model distribution represents a transaction amount distribution for a model merchant having products priced at numerous different transaction amounts. The computer executable instructions further cause the analytics computing device to compare the angle distance to a predefined threshold value, identify whether the merchant is a recurring payment merchant that performs recurring payment transactions based upon the computed angle distance and the threshold value, store within a database that the merchant is a recurring payment merchant if so determine, and alert an analyst that the merchant is a recurring payment merchant by transmitting an alert message to a user computing device in communication with the analytics computing device.

BRIEF DESCRIPTION OF THE DRAWINGS

FIG. 1 is a simplified block diagram of an example system used for analyzing payment transaction data to identify merchants having a recurring payment program in accordance with an example embodiment of the present disclosure.

FIG. 2 is a schematic diagram illustrating an example multi-party payment processing system for enabling payment-by-card transactions.

FIG. 3 illustrates an example configuration of user system, such as a client system shown in FIG. 1, in accordance with an embodiment of the present disclosure.

FIG. 4 illustrates an example configuration of the server system shown in FIG. 1, in accordance with an embodiment of the present disclosure.

FIG. 5 is a flow diagram illustrating an example method for analyzing payment transaction data to identify merchants having a recurring payment program, which may be implemented utilizing the system shown in FIG. 1.

FIG. 6 illustrates an example configuration of an analytics computing device, in accordance with one embodiment of the present disclosure.

FIG. 7 shows an example configuration of a database coupled to or included within an analytics computing device, such as the analytics computing device shown in FIGS. 1 and 6.

Like numbers in the figures indicate the same or functionally similar components.

DETAILED DESCRIPTION

Figure 1:
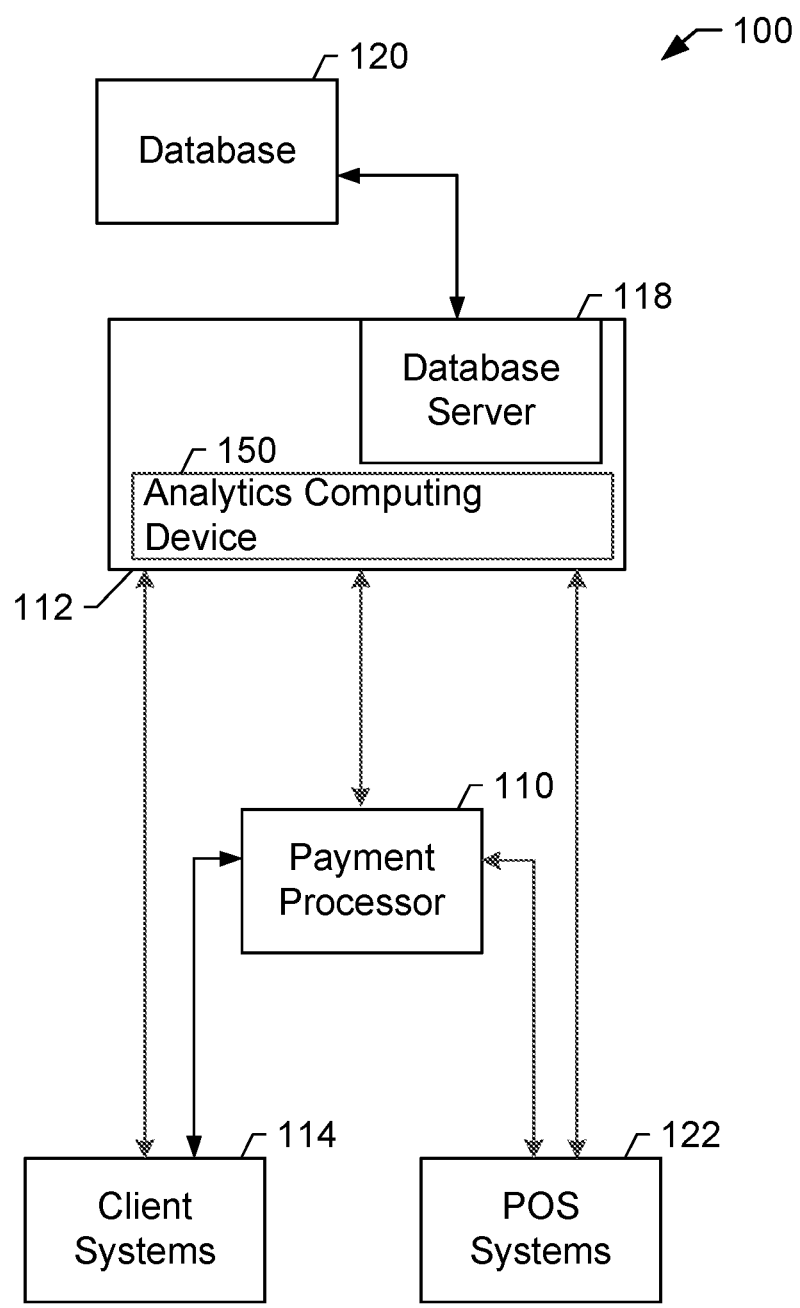
FIGS. 1-7 show example embodiments of the methods and systems described herein.

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, data analysis systems and methods for identifying merchants that perform recurring payment transactions (e.g., recurring payment programs). The analytics computing system described herein includes at least one analytics computing device that collects and analyzes transaction data and generates one or more metrics for identifying merchants having a recurring payment program. The analytics computing device may be in communication with at least one merchant computing device, a payment network, a payment processor, at least one client system, and at least one issuer computing device. The at least one merchant computing device may be a point-of-sale system and/or similar to the at least one client system. The at least one client system may be any device capable of accessing the Internet including, but not limited to, a desktop computer, a laptop computer, a personal digital assistant (PDA), a cellular phone, a smartphone, a tablet, a phablet, or other web-based connectable equipment. The analytics computing device may also be in communication with a database for storing transaction.

The analytics computing device includes a processor in communication with a memory. The analytics computing device is further in communication with at least one database for storing information, such as transaction data. The transaction data may include payment transactions initiated by a user using a payment device (e.g., a payment card, digital wallet, mobile payment, etc.) associated with a particular transaction processing network. The transaction data may also include, among other data points, data associated with the user and the merchant involved in the payment transaction. For example, transaction data may include one or more of: a user account data (e.g., PAN), user biometric data, a merchant identifier, a merchant computing device identifier, a transaction amount, a time and date (i.e., timestamp) of the transaction, data descriptive of the purchase, a location of the transaction, merchant category, and/or other data associated with the payment transaction.

In the example embodiment, the analytics computing device utilizes the merchant identifier, the user account data, the transaction amount, and the time and date of the transaction to identify merchants performing recurring payment transactions. In the example embodiment, the analytics computing device is configured to receive the transaction data from the payment processor. In alternative embodiments, the analytics computing device is configured to receive the transaction data directly from a merchant computing device or from both the payment processor and the merchant computing device. The analytic computing device is also configured to store the transaction data within a database, perform a look up within the database including parsing the transaction data to identify the merchant identifier, the user account data, the transaction amount, and the time and date of the transaction, and retrieve the parsed data.

In some embodiments, once the parsed data is retrieved, the analytics computing device may further retrieve the leading numbers or digits of the transaction amounts and compare them to an expected distribution, such as a distribution proposed by Benford's Law. In an example, a merchant, such as a gym or fitness facility, may illustrate a tendency to have a particular numeral appear repeatedly as the first numeral of the transaction amounts. Such a tendency may be utilized by the analytics computing device, at least partially, to identify, for example, that the gym performs recurring payment transactions as part of monthly memberships and an actual distribution of the transaction amounts associated with the gym do not conform to a theoretical distribution or stored model distribution, such as the theoretical distribution of Benford's Law. In the example embodiment, the stored model distribution may represent a transaction amount distribution for a model merchant. The model merchant may be a merchant that has products priced at numerous different transaction amounts, for example. The model merchant may also be specific to a particular merchant category. For purposes of this application, Benford's Law is an observation about a frequency distribution of leading digits or numbers in a set of data and, more particularly, in a set of transaction amounts. The law states that in many occurring sets of integers, the leading significant digit is likely to be small (e.g., integer one tends to occur with probability of about thirty percent, much greater than an expected about eleven percent for integer nine).

In one example, the analytics computing device may apply Benford's Law to predict or identify merchants performing recurring payment transactions. As stated above, if the analytics computing device determines that the actual distribution of merchant's transaction data does not conform to the theoretical distribution of Benford's Law, the analytics computing device may identify that the merchant is performing recurring payment transactions. The analytics computing device may use, for example, a ten percent random sample of transaction amounts from each aggregate merchant (grouping merchants by a merchant identifier) in order to apply Benford's Law. The analytics computing device is configured to group merchants by the merchant identifier so as to group all transactions performed by each individual merchant. After each merchant is aggregated, the analytics computing device computes and summarizes, by aggregate merchant, a distribution of the numbers or integers occurring one through nine in the first position of the transaction amount and a number of transactions.

By performing this computation and summarization, the analytics computing device computes an angle distance between the actual distribution and the theoretical distribution identified by Benford's Law. The computed angle is the cosine similarity of the two distributions. In one example, the analytics computing device computes the angle by calculating the cosine similarity of transaction amounts (cos_ta) and the theoretical distribution, and the cosine similarity of payment card transaction days between visits (cos_cdb) and the theoretical distribution. Subsequently, the analytics computing device applies rules to both cosines. In this example, the analytics computing device applies the formula $(cos\_ta*(cos\_cdb^2))^2$ to both cosines. After applying the formula, the analytics computing device determines that a merchant is performing recurring payment transactions if the result is a value that is less than 0.3. In this case, the value of 0.3 is the threshold. In other cases, the threshold may be another number that enables the analytics computing device to determine that a merchant performs recurring payment transactions. By performing the calculation of the cosine similarity of transaction amounts and the theoretical distribution, and the cosine similarity of payment card transaction days between visits and the theoretical distribution, the analytics computing device is capable of identifying merchants performing recurring payment transactions based upon either payment card transaction amounts or payment card transaction frequency (e.g., days between visits).

The larger the angle distance (e.g., a reflex angle) between the actual distribution and the theoretical distribution the more likely the aggregate merchant performs recurring payment transactions. Conversely, the smaller the angle distance (e.g., acute angle) between the actual distribution and the theoretical distribution the more likely the aggregate merchant does not perform recurring payment transactions. If the analytics computing device determines that the angle distance between both distributions is large, based on a predefined threshold, the analytics computing device assigns to the aggregate merchant an indicator identifying the aggregate merchant as a merchant performing recurring payment transactions. Conversely, if the analytics computing device determines that the angle distance between both distributions is small, based on a predefined threshold, the analytics computing device assigns to the aggregate merchant an indicator identifying the aggregate merchant as a merchant not performing recurring payment transactions.

More specifically, and for each aggregate merchant, the actual distribution of the frequency of occurrence of each number (i.e., 1, 2, 3, 4, 5, 6, 7, 8, 9) spanning all payment transactions performed by the aggregate merchant among the transaction count along with the transaction amounts and average transaction amount is computed and represented as a percentage of the whole. These actual distributions are then stored electronically in a table. A representation of such a table is shown in Table 1.

TABLE 1

| Aggregate Merchant | Number | Distribution | Benford's Law Distribution |
|---|---|---|---|
| 12345 | 1 | 16% | 30.1% |
| 12345 | 2 | 14% | 17.6% |
| 12345 | 3 | 20% | 12.5% |
| 12345 | 4 | 12% | 9.7% |
| 12345 | 5 | 5% | 7.9% |
| 12345 | 6 | 19% | 6.7% |
| 12345 | 7 | 2% | 5.8% |
| 12345 | 8 | 8% | 5.1% |
| 12345 | 9 | 4% | 4.6% |
| 67890 | 1 | 8% | 30.1% |
| 67890 | 2 | 14% | 17.6% |
| 67890 | 3 | 12% | 12.5% |
| 67890 | 4 | 3% | 9.7% |
| 67890 | 5 | 5% | 7.9% |
| 67890 | 6 | 3% | 6.7% |
| 67890 | 7 | 30% | 5.8% |
| 67890 | 8 | 18% | 5.1% |
| 67890 | 9 | 7% | 4.6% |

Once the actual distributions for each aggregate merchant are computed, the analytics computing device is configured to determine a numerical signature for each aggregate merchant. The numerical signature employs an observation regarding the actual distribution of numerals in the first position of a transaction amount and a transaction volume by day, for example. To be specific, the actual distribution tends to be somewhat unique when various merchant data are aggregated and the actual distribution tends to be inconsistent with the theoretical distribution proposed by Benford's Law. For example, a mobile phone service provider may illustrate a tendency to have a particular numeral appear repeatedly as the first numeral of the transaction amounts associated with the mobile phone service provider. The tendency to have the particular numeral appear repeatedly may also be referred to herein as the mode of the transaction amount distribution or transaction amount distribution mode. That is, the mode is a value that occurs most often within the distribution. Such a tendency may be utilized by the analytics computing device, at least partially, to identify, for example, that the mobile phone service provider is likely to perform recurring payment transactions. In other words, the analytics computing device may identify that the mobile phone service provider performs recurring payment transactions by generating an actual distribution of the transaction amounts (also referred to herein as an actual transaction amount distribution) associated with the mobile phone service provider, comparing the actual transaction amount distribution to the theoretical distribution of Benford's Law, and determining that the actual transaction amount distribution does not conform to the distribution of Benford's Law.

The analytics computing device determines the numerical signature by computing the dot product of each aggregate merchant's actual distribution vector and the theoretical distribution vector proposed by Benford's Law. This dot product (e.g., angle of divergence) is divided by the sum of the squares of each aggregate merchant's actual distribution vector. The distribution identified in Benford's law is computed and electronically stored in a table. A representation of such a table is shown in Table 2.

TABLE 2

| Aggregate Merchant | Numerical Signature |
|---|---|
| 12345 | 70.9 |
| 67890 | 75.4 |

For example, for each transaction, the actual distribution of the frequency of occurrence of each number (1, 2, 3, 4, 5, 6, 7, 8, 9) spanning the transaction count, transaction amounts, and average transaction amount observed during a one month interval for the given aggregate merchant is computed and represented as a percentage of the whole.

In other embodiments, the analytics computing device may use the transaction amount, the user account data, and time and/or date (also referred to herein as timestamp) of the transaction to predict or identify merchants performing recurring payment transactions. More specifically, once the analytics computing device has retrieved the parsed data, the analytics computing device analyzes the transaction amount, the user account data, and timestamp of the transaction. The analytics computing device performs the analysis in several ways. One way is by taking the transaction amount associated with the merchant identifier and determining that the transaction amounts are distributed in groups. That is, for example, a merchant, such as a gym, may offer different packages that have standard prices (e.g., basic $19.99, premium $29.99, and deluxe $39.99). The analytics computing device parses the transaction data associated with the merchant and determines that the majority of the transaction amounts may be grouped in three categories (e.g., $19.99, $29.99, and $39.99). Further, the analytics computing device may determine that the merchant performs recurring payment transactions by performing a look up of the date of the transactions associated with the merchant. For example, if the date of the transactions is always or most of the time the same day (e.g., $28^{th}$ day of each month or plus or minus a few days from the $28^{th}$ day of the month), the analytics computing device may determine that the transactions are recurring and that the merchant performs recurring payment transactions. In other words, the analytics computing device generates a distribution using the date of the transaction (i.e., a timestamp distribution) and identifies the date that occurs most often within the distribution. The date that occurs most often is also referred to as the timestamp distribution mode or the mode of the timestamp distribution.

In yet other embodiments, the analytics computing device may group merchants by merchant categories (e.g., cable providers, insurance providers, loan providers, candy shops, or other categories that may be used to group merchants) and identify the merchant categories having transaction amount distributions (e.g., actual distributions) that are dissimilar or similar to the theoretical distribution identified by Benford's Law, as explained above. If the actual distribution of a merchant category is not similar to Benford's Law, the analytics computing device is configured to assign an indicator in the form of a score to the category, wherein the score indicates how likely a merchant category is to have a recurring payment program. For example, if a merchant category A has a higher score than a score of a merchant category B, the merchant category A is more likely to have a recurring payment program than the merchant category B. The analytics computing device is also configured to determine, based upon a predefined value or threshold, whether an actual distribution is similar to the theoretical distribution identified by Benford's Law. By assigning this indicator, the analytics computing device is able to differentiate merchants that may seem to be performing recurring payment transactions, such as merchants that have standard prices and/or perform payment transactions around the same day, from those merchants that are well-known for offering recurring payment transaction programs.

For example, a merchant, such as a candy store, may only sell two varieties of products. In this example, the merchant may sell a single box of candy and a double box of candy. The single box may have a price of $5.00 and the double box may have a price of $10.00. Because there are only two standard prices, the transaction amount distribution for this merchant would not follow the theoretical distribution identified by Benford's Law and the merchant could be presumed to be performing recurring payment transactions. However, because the analytics computing device is configured to retrieve and analyze transaction amounts along with the transaction dates associated with the transaction amounts and/or identify merchants by merchant category (e.g., candy store), the analytics computing device is configured to determine whether a merchant performs recurring payment transactions using other factors in addition to the actual distribution comparison to the theoretical distribution identified by Benford's Law. In this example, the analytics computing device may determine that the candy store category does not have the score to qualify as a category of merchants performing recurring payment transactions. The analytics computing device may also determine that a merchant does not perform recurring payment transactions if most transaction dates fall on different dates (e.g., the transaction dates do not follow a normal distribution).

By determining whether the merchant performs recurring payment transactions (using any of the approaches described above), the analytics computing device is able to identify potentially fraudulent transactions by recognizing payment transactions associated with the merchant that do not follow the type of payment transactions that the merchant usually performs. For example, if the analytics computing device determines that the merchant performs recurring payment transactions, but a predefined number of payment transactions associated with the merchant do not follow one of the models of recurring payment transactions, the analytics computing device flags the non-compliant payment transactions as potentially compromised and may transmit a fraud alert regarding the compromised payment transactions to an issuer, the merchant, and/or the user.

In another embodiment, the analytics computing device is configured to receive payment transaction data (e.g., second payment transaction data) for a plurality of transactions (e.g., second plurality of transactions) associated with the merchant, wherein the second payment transaction data is for a set of payment transactions that are different from the initial plurality of transactions used to generate the first payment transaction data. The second payment transaction data may include at least a transaction amount, a transaction timestamp, a merchant category, and the merchant identifier. The second payment transaction data is received from the payment network in communication with the analytics computing device. The analytics computing device is further configured to generate a second actual transaction amount distribution for the merchant using the transaction amounts from the second payment transaction data, compare the second actual transaction amount distribution to the actual transaction amount distribution for the merchant from the initial plurality of transactions, determine whether the second actual transaction amount distribution is dissimilar to the actual transaction amount distribution for the merchant, generate a fraud alert message if the second actual transaction amount distribution is determined to be dissimilar to the actual transaction amount distribution for the merchant, and transmit the fraud alert message to at least one of the merchant, an issuer, and the analyst advising that the merchant has likely experienced fraudulent transactions included in the second plurality of transactions. In other words, after generating an actual transaction amount distribution for the merchant from a first set of transactions, the system may then later determine a second actual transaction amount distribution for the merchant from a second set of transactions. If this second distribution matches the first distribution (e.g., the transaction amounts are similar), then it is likely this second set of transactions are non-fraudulent because they follow the same pattern. If, however, the distributions are different, than some of the second set of transactions may be fraudulent.

The methods and systems described herein may be implemented using computer programming or engineering techniques including computer software, firmware, hardware, or any combination or subset thereof. As disclosed above, at least one technical problem with prior payment processing systems is that the systems do not efficiently identify merchants that perform recurring payment transactions. Therefore, these merchants may not know about some known systems that may provide merchants with updated user payment information precluding these merchant from benefiting of the updating services provided by the known systems.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as computing devices in the form of mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a simplified block diagram of an example analytics computing system 100 used for identifying merchants performing recurring payment program transactions (e.g., recurring payment transactions) based upon collected and analyzed transaction data in accordance with one example embodiment of the present disclosure. Analytics computing system 100 may be implemented in the performance of payment-by-card transactions received as part of processing consumer transactions. In an example embodiment, analytics computing system 100 is a payment processing system that includes at least one analytics computing device 150 configured to collect and analyze data to identify patterns and, more specifically, to analyze payment transaction data to identify merchants having a recurring payment program.

In the example embodiment, analytics computing system 100 includes a server system 112 and client systems 114. In some embodiments, client systems 114 include computing devices configured to implement a web browser or a software application, which enables client systems 114 to access server system 112 using the Internet. Client systems 114 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems 114 include any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, client systems 114 may be computing devices associated with one of user 222, merchant 224, merchant/acquirer bank 226, and/or issuer bank 230, as illustrated in FIG. 2.

In one embodiment, server system 112 includes a database server 118 that is communicatively coupled to a database 120 for storing data. In an exemplary embodiment, database 120 stores transaction information from a plurality of users 222 and/or merchants 224 and paths based on the individual transactions. According to the example embodiment, database 120 is disposed remotely from server system 112. In other embodiments, database 120 is decentralized, or may be a portion of server system 112. In the example embodiment, a user (not shown) is able to access database 120 through client systems 114 by logging onto server system 112. In the example embodiment, server system 112 may be associated with payment processor 110. Payment processor may be associated with interchange network 228 (shown in FIG. 2).

Analytics computing system 100 may further include one or more point-of-sale (POS) systems 122 that are communicatively coupled with server system 112. POS systems 122 may be associated with, for example, merchants 224, and may be communicatively coupled with server system 112 through payment processor 110. POS systems 122 may also be directly communicatively coupled with server system 112. POS systems 122 may include, without limitation, machines that accept card swipes, online payment portals, digital wallet payments, or stored payment card numbers for recurring payment transactions.

Figure 2:
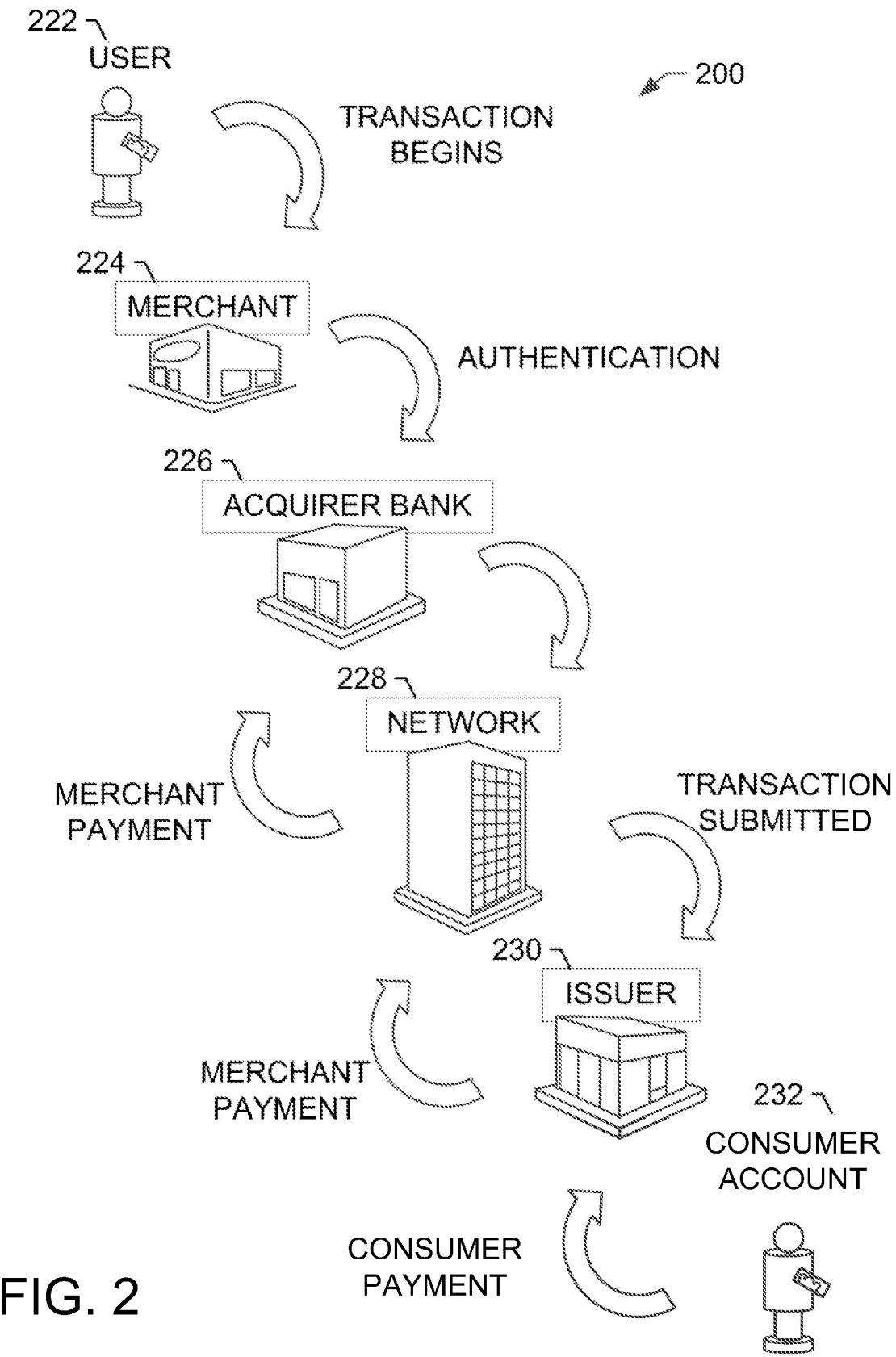

In the example embodiment, server system 112 is associated with a financial transaction interchange network, such as interchange network 228 shown in FIG. 2, and is also referred to as an interchange computer system. In some embodiments, server system 112 is used for processing payment transaction data (also referred to herein as transaction data) and analyzing such data to identify merchants performing recurring payment transactions and/or to identify fraudulent transactions. In one embodiment, at least one of client systems 114 includes a computer system associated with an issuer of a transaction payment card. Accordingly, server system 112 and client systems 114 may be utilized to process transaction data relating to purchases that user 222 makes utilizing a transaction card processed by interchange network 228 and issued by the associated issuer bank 230. In the example embodiment, at least one client system 114 may be associated with user 222 seeking to register, access information, or process a transaction with at least one of interchange network 228, issuer bank 230, and/or merchant 224. In addition, client systems 114 or POS systems 122 may include individual point-of-sale (POS) terminals (not shown) associated with merchant 224 and used for processing payment transactions.

In the example embodiment, analytics computing device 150 includes a processor in communication with a memory. Analytics computing device 150 is further in communication with at least one database, such as database 120 and/or database server 118, for storing information (e.g., transaction data). The transaction data may include payment transactions initiated by user 222 using a payment device (e.g., a payment card, digital wallet, mobile payment, etc.) associated with interchange network 228. The transaction data may also include, among other data points, data associated with user 222 and merchant 224 involved in the payment transaction. For example, transaction data may include one or more of a user account data (e.g., primary account identifier (PAN)), user biometric data, a merchant identifier, a merchant computing device identifier, a transaction amount, a time and date of the transaction, data descriptive of the purchase, a location of the transaction, and/or other data associated with the payment transaction.

In the example embodiment, analytics computing device 150 utilizes the merchant identifier, the user account data, the transaction amount, and the time and date of the transaction to determine whether a merchant, such as merchant 224, performs recurring payment transactions. Analytics computing device 150 is configured to receive the transaction from payment processor 110. In alternative embodiments, analytics computing device 150 is configured to receive the transaction data directly from a merchant computing device, such as POS systems 122 and/or client systems 114, or from both payment processor 110 and the merchant computing device. Analytics computing device is also configured to store the transaction data within a database (e.g., database 120 and/or database server 118), perform a look up within the database including parsing the transaction data to identify the merchant identifier, the user account data, the transaction amount, and the time and date of the transaction, and retrieve the parsed data.

In some embodiments, once the parsed data is retrieved, analytics computing device 150 may further retrieve the leading digits of the transaction amounts and compare them to an expected or model distribution, such as a distribution proposed by Benford's Law. In an example, merchant 224 may be a gym or a fitness facility. In this case, the transaction amounts of the payment transactions associated with merchant 224 may illustrate a tendency to have a particular numeral appear repeatedly as the first or leading numeral of the transaction amounts. Such a tendency may be utilized by analytics computing device 150, at least partially, to identify, for example, that merchant 224 performs recurring payment transactions as part of monthly memberships and an actual distribution of transaction amounts (also referred to herein as an actual transaction amount distribution) associated with merchant 224 do not conform to the theoretical distribution of Benford's Law.

In one example, analytics computing device 150 may apply Benford's Law to predict or identify merchants performing recurring payment transactions. As stated above, if analytics computing device 150 determines that the actual distribution of merchant's 224 transaction data does not conform to the theoretical distribution of Benford's Law, analytics computing device 150 may identify that merchant 224 as performing recurring payment transactions. Analytics computing device 150 may use, for example, a ten percent random sample of transaction amounts from each aggregate merchant (grouping merchants by a merchant identifier) in order to apply Benford's Law. Analytics computing device is configured to group merchants by the merchant identifier so as to group all transactions performed by each merchant. After each merchant is aggregated, the analytics computing device computes and summarizes, by aggregate merchant, a distribution of the numbers one through nine occurring in the first position of the transaction amount and a number of transactions.

By performing this computation and summarization, analytics computing device 150 computes an angle distance between the actual distribution and the theoretical distribution identified by Benford's Law. The larger the angle distance between the actual distribution and the theoretical distribution the more likely the aggregate merchant performs recurring payment transactions. Conversely, the smaller the angle distance between the actual distribution and the theoretical distribution the more likely the aggregate merchant does not perform recurring payment transactions. If analytics computing device 150 determines that the angle distance between both distributions is large, based on a predefined threshold, analytics computing device 150 assigns to the aggregate merchant an indicator identifying the aggregate merchant as a merchant performing recurring payment transactions. Conversely, if analytics computing device 150 determines that the angle distance between both distributions is small, based on a predefined threshold, analytics computing device 150 assigns to the aggregate merchant an indicator identifying the aggregate merchant as a merchant not performing recurring payment transactions.

More specifically, and for each aggregate merchant, the actual distribution of the frequency of occurrence of each number (i.e., 1, 2, 3, 4, 5, 6, 7, 8, 9) spanning all payment transactions performed by the merchant among the transaction count along with transaction amounts, and average transaction amount is computed and represented as a percentage of the whole. These actual distributions are then stored in a table. A representation of such table is shown in Table 1 above.

Once the actual distributions for each aggregate merchant are computed, analytics computing device 150 is configured to determine a numerical signature for each aggregate merchant. The numerical signature employs an observation regarding the actual distribution of numerals in the first position of a transaction amount and a transaction volume by day, for example. To be specific, the actual distribution tends to be somewhat unique when various merchant data are aggregated and the actual distribution tends to be inconsistent with the theoretical distribution proposed by Benford's Law. For example, a mobile phone service provider may illustrate a tendency to have a particular numeral appear repeatedly as the first numeral of a transaction amount. Such a tendency can be utilized by analytics computing device 150, at least partially, to identify, for example, that the mobile phone service provider is likely to perform recurring payment transactions.

Analytics computing device 150 determines the numerical signature by computing the dot product of each aggregate merchant's actual distribution vector and the theoretical distribution vector proposed by Benford's Law. This dot product (e.g., angle of divergence) is divided by the sum of the squares of each aggregate merchant's actual distribution vector. The distribution identified in Benford's law is computed and electronically stored in a table. A representation of such a table is shown in Table 2 above.

For example, for each transaction, the distribution of the frequency of occurrence of each number (1, 2, 3, 4, 5, 6, 7, 8, 9) spanning the transaction count, transaction amount, and average transaction amount observed during a one month interval for the given aggregate merchant is computed and represented as a percentage of the whole.

In other embodiments, analytics computing device 150 may use the transaction amount, the user account data, and time and date of the transaction to predict or identify merchants performing recurring payment transactions. More specifically, once analytics computing device 150 has retrieved the parsed data, analytics computing device 150 analyzes the transaction amount, the user account data, and time and date of the transaction. Analytics computing device 150 performs the analysis in several ways. One way is by taking the transaction amount associated with the merchant identifier and determining that the transaction amounts are distributed in groups. That is, for example, merchant 224 may be a spa that offers different packages that have standard prices (e.g., basic $19.99, premium $29.99, and deluxe $39.99). Analytics computing device 150 parses the transaction data associated with merchant 224 and determines that the majority of the transaction amounts may be grouped in three categories (e.g., $19.99, $29.99, and $39.99). Further, analytics computing device 150 may determine that merchant 224 performs recurring payment transactions by performing a look up of the date of the transactions associated with merchant 224. For example, if the date of the transactions is always or most of the time the same day (e.g., $28^{th}$ day of each month or plus or minus a few days (a predefined number of days) from the $28^{th}$ day of the month), analytics computing device 150 may determine that the transactions are recurring and that merchant 224 performs recurring payment transactions.

In yet other embodiments, analytics computing device 150 may group merchants by merchant categories (e.g., cable providers, insurance providers, loan providers, candy shops, or other categories that may be used to group merchants) and identify the merchant categories having transaction amount distributions (e.g., actual distributions) that are dissimilar or similar to the theoretical distribution identified by Benford's Law, as explained above. If the actual distribution of a merchant category is not similar to Benford's Law, analytics computing device 150 is configured to assign an indicator in the form of a score to the category, wherein the score indicates how likely a merchant category is to have a recurring payment program. For example, if a merchant category A has a higher score than a score of a merchant category B, the merchant category A is more likely to have a recurring payment program than the merchant category B.

Analytics computing device 150 is also configured to determine, based upon a predefined value or threshold, whether an actual distribution is similar to the theoretical distribution identified by Benford's Law. The predefined value or threshold may be, for example, a percentage of similarities between the actual distribution and the theoretical distribution. For example, if analytics computing device 150 identifies that the distribution of the actual distribution is 60% or below (i.e., predefined threshold value) similar to the theoretical distribution (e.g., matching between actual and theoretical), analytics computing device 150 may determine the actual distribution does not conform with the theoretical distribution and thus, the merchant associated with the actual distribution likely uses a recurring payment program. Analytics computing device 150 may identify similarities between the actual distribution and the theoretical distribution by comparing the percentage of occurrences of a number in the actual distribution to the percentage of occurrences of a corresponding number in the theoretical distribution. Analytics computing device 150 may also identify similarities between the actual distribution and the theoretical distribution by comparing the actual distribution mode (i.e., the value that occurs most often in the actual distribution) to the theoretical distribution mode (i.e., the value that occurs most often in the theoretical distribution). After comparing both distribution modes, analytics computing device 150 may determine the actual distribution and the theoretical distribution are similar if the values of the actual distribution mode and the value theoretical distribution mode are the same.

By assigning the indicator, analytics computing device 150 is able to differentiate merchants that may seem to be performing recurring payment transactions, such as merchants that have standard prices and/or perform payment transactions around the same day, from those merchants that are well-known for offering recurring payment transaction programs.

For example, merchant 224, such as a candy store, may only sell two varieties of products. In this example, merchant 224 may sell a single box of candy and a double box of candy. The single box may have a price of $5.00 and the double box may have a price of $10.00. Because there are only two standard prices, the transaction amount distribution for merchant 224 would not follow the theoretical distribution identified by Benford's Law and merchant 224 could be presumed to be performing recurring payment transactions. However, because analytics computing device 150 is configured to retrieve and analyze transaction amounts along with the transaction dates associated with the transaction amounts and/or identify merchants by merchant category (e.g., candy store), analytics computing device 150 is configured to determine whether merchant 224 performs recurring payment transactions using other factors in addition to the actual distribution comparison to the theoretical distribution identified by Benford's Law. In this example, analytics computing device 150 may determine that the candy store category does not have the score to qualify as a category of merchants performing recurring payment transactions. Analytics computing device 150 may also determine that merchant 224 does not perform recurring payment transactions if most transaction dates fall on different dates (e.g., the transaction dates do not follow a normal distribution).

Once analytics computing device 150 determines merchant 224 is a recurring payment merchant, analytics computing device 150 is configured to alert an analyst that the merchant is a recurring payment merchant by transmitting an alert message to a user computing device in communication with the analytics computing device.

By determining whether merchant 224 performs recurring payment transactions (using one of the approaches described above), analytics computing device 150 is able to identify potentially fraudulent transactions by recognizing payment transactions associated with merchant 224 that do not follow the type of payment transactions that merchant 224 usually performs. For example, if analytics computing device 150 determines that merchant 224 performs recurring payment transactions, but a predefined number of payment transactions associated with merchant 224 do not follow one of the models of recurring payment transactions, analytics computing device 150 flags the non-compliant payment transactions as potentially compromised and may transmit a fraud alert regarding the compromised payment transactions to issuer bank 230, merchant 224, and/or user 222.

Analytics computing device 150 is configured to build a merchant profile using, for example, the transaction data, the actual distributions, and the theoretical distribution. Analytics computing device 150 is also configured to assign to the merchant profile the indicator which indicates how likely a merchant is to have a recurring payment program. Analytics computing device 150 is also configured to send an alert to an analyst advising the analyst that analytics computing device 150 has determined that it is likely that a particular merchant is a recurring payment merchant.

For example, in another embodiment, analytics computing device 150 is configured to receive payment transaction data (e.g., second payment transaction data) for a plurality of transactions (e.g., second plurality of transactions) associated with the merchant, wherein the second payment transaction data is for a set of payment transactions that are different from the initial plurality of transactions used to generate the first payment transaction data. The second payment transaction data may include at least a transaction amount, a transaction timestamp, a merchant category, and the merchant identifier. The second payment transaction data is received from the payment network in communication with analytics computing device 150. Analytics computing device 150 is further configured to generate a second actual transaction amount distribution for the merchant using the transaction amounts from the second payment transaction data, compare the second actual transaction amount distribution to the actual transaction amount distribution for the merchant from the initial plurality of transactions, determine whether the second actual transaction amount distribution is dissimilar to the actual transaction amount distribution for the merchant, generate a fraud alert message if the second actual transaction amount distribution is determined to be dissimilar to the actual transaction amount distribution for the merchant, and transmit the fraud alert message to at least one of the merchant, an issuer, and the analyst advising that the merchant has likely experienced fraudulent transactions included in the second plurality of transactions. In other words, after generating an actual transaction amount distribution for the merchant from a first set of transactions, the system may then later determine a second actual transaction amount distribution for the merchant from a second set of transactions. If this second distribution matches the first distribution (e.g., the transaction amounts are similar), then it is likely this second set of transactions are non-fraudulent because they follow the same pattern. If, however, the distributions are different, than some of the second set of transactions may be fraudulent.

FIG. 2 is a schematic diagram illustrating an example multi-party payment processing system 200 for enabling payment-by-card transactions between merchants 224, users 222, and issuer bank 230. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

As described with respect to payment processing system 200, a financial institution called the "issuer" issues a transaction card or electronic payments account identifier, such as a credit card or debit card, to a consumer, cardholder, or user 222, who uses the transaction card to tender payment for a purchase from a merchant 224. To accept payment with the transaction card, merchant 224 must normally establish an account with a financial institution that is part of the financial payment system. This financial institution is usually called the "merchant bank," the "acquirer bank," or the "acquirer." When user 222 tenders payment for a purchase with a transaction card, merchant 224 requests authorization from an acquirer bank 226 for the amount of the purchase. The request may be performed over the telephone, but is usually performed through the use of a point-of-sale (POS) terminal or a computing device, which reads user's 222 account information from a magnetic stripe, a chip, or embossed characters on the transaction card and communicates electronically with the transaction processing computers of acquirer bank 226. Alternatively, acquirer bank 226 may authorize a third party to perform transaction processing on its behalf. In this case, the POS terminal will be configured to communicate with the third party. Such a third party is usually called a "merchant processor," an "acquiring processor," or a "third party processor."

Using an interchange network 228, computers of acquirer bank 226 or merchant processor will communicate with computers of an issuer bank 230 to determine whether user account 232 associated with user 222 is in good standing and whether the purchase is covered by user account 232 available credit line. Based on these determinations, the request for authorization will be declined or accepted. If the request is accepted, an authorization code is issued to merchant 224.

When a request for authorization is accepted, the available credit line of user account 232 is decreased. Normally, a charge for a payment card transaction is not posted immediately to user account 232 because bankcard associations, such as Mastercard International Incorporated, have promulgated rules that do not allow merchant 224 to charge, or "capture," a transaction until goods are shipped or services are delivered. However, with respect to at least some debit card transactions, a charge may be posted at the time of the transaction. When merchant 224 ships or delivers the goods or services, merchant 124 captures the transaction by, for example, appropriate data entry procedures on the point-of-sale terminal. This may include bundling of approved transactions daily for standard retail purchases. If user 222 cancels a transaction before it is captured, a "void" is generated. If user 222 returns goods after the transaction has been captured, a "credit" is generated. Interchange network 228 and/or issuer bank 230 stores the transaction card information, such as a category of merchant, a merchant identifier, a location where the transaction was completed, amount of purchase, and date and time of the transaction in a database 120 (shown in FIG. 1).

After a purchase has been made, a clearing process occurs to transfer additional transaction data related to the purchase among the parties to the transaction, such as acquirer bank 226, interchange network 228, and issuer bank 230. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, user account 232 is decreased. Normally, a charge is posted immediately to user account 232. The payment card association then transmits the approval to the acquiring processor for distribution of goods/services or information, or cash in the case of an automated teller machine (ATM).

After a transaction is authorized and cleared, the transaction is settled among merchant 224, acquirer bank 226, and issuer bank 230. Settlement refers to the transfer of financial data or funds among acquirer bank 226, issuer bank 230, and merchant's 224 account related to the transaction. Usually, transactions are captured and accumulated into a "batch," which is settled as a group. More specifically, a transaction is typically settled between issuer bank 230 and interchange network 228, and then between interchange network 228 and acquirer bank 226, and then between acquirer bank 226 and merchant 224.

In some embodiments, user 222 registers one or more payment cards with a digital wallet. Having done this, user 222 can interact with a participating online merchant 224. At the check-out stage, online merchant 224 displays a button on the merchant website which user 222 can click on in order to make a payment using the user's 222 digital wallet. Online merchant 224 then redirects user 222 to a "switch" operated by interchange network 228. Using a cookie located on a user computing device, the "switch" is able to determine which wallet-hosting server hosts a wallet associated with user 222. The switch then establishes a connection between the user computing device and the appropriate wallet-hosting system, which presents user 222 with a sign-in page (e.g., as a pop-up window), where there is an authentication process (e.g., entry of a pre-agreed password). This log-in process may use the same login credentials (e.g., password) which user 222 also uses to obtain access to other online banking activities.

The wallet-hosting system then securely transfers user 222 payment information to the online merchant's domain. The merchant's domain submits user's 222 payment information to acquirer bank 226 for a separate authorization process in which the acquiring domain communicates with the issuer bank 230 to ask the bank to authorize the transaction. Thus, user 222 is not required to enter their card details (except at the stage of initially registering with the wallet-hosting system), and the online transaction process is streamlined with only a single redirection, and consistent branding for the entire payment process, irrespective of the online merchant 224.

In some embodiments, a unique identifier is provided to user 222. The unique identifier is different from the number associated with user account 232. In these embodiments, interchange network 228 stores the unique identifier in database 120 along with user account 232. When interchange network 228 receives the unique identifier, interchange network 228 determines the associated user account 232 and uses that information in processing the payment transaction.

Figure 3:
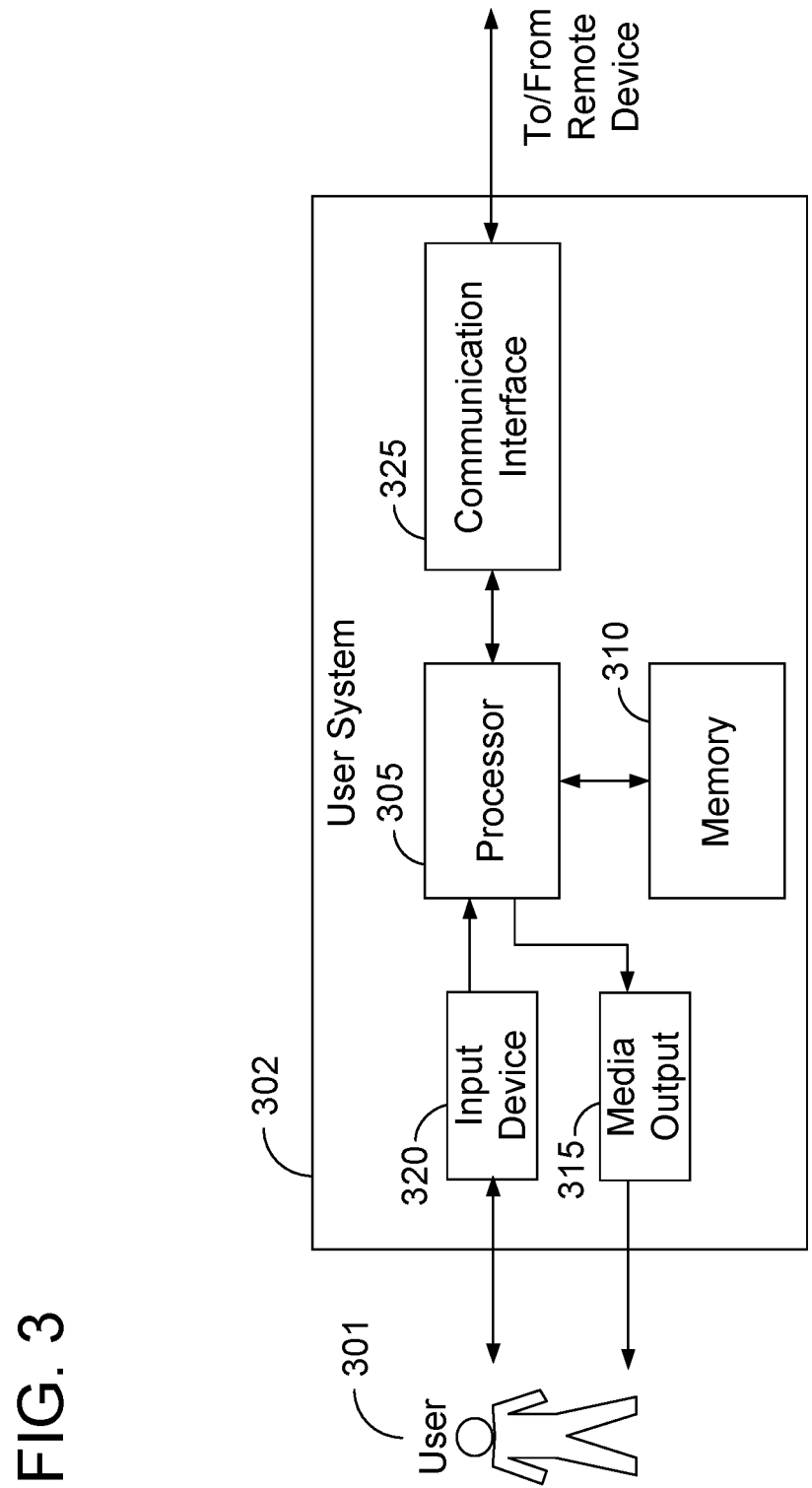

FIG. 3 illustrates an example configuration of a user system 302, such as client systems 114 (shown in FIG. 1) configured to transmit data to analytics computing device 150 (shown in FIG. 1). User system 302 may include, but is not limited to, client systems 114. In the example embodiment, user system 302 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

User system 302 also includes at least one media output component 315 for presenting information to user 301. User 301 may include, but is not limited to, user 222 (shown in FIG. 2). Media output component 315 is any component capable of conveying information to user 301. For example, media output component 315 may be a display component configured to display component lifecycle data in the form of reports, dashboards, communications, and the like. In some embodiments, media output component 315 includes an output adapter such as a video adapter and/or an audio adapter. An output adapter is operatively coupled to processor 305 and operatively connectable to an output device, such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component, such as a touch screen, may function as both an output device of media output component 315 and input device 320. User system 302 may also include a communication interface 325, which is communicatively connectable to a remote device such as server system 112 (shown in FIG. 1). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from server system 112. A client application allows user 301 to interact with a server application from server system 112.

Figure 4:
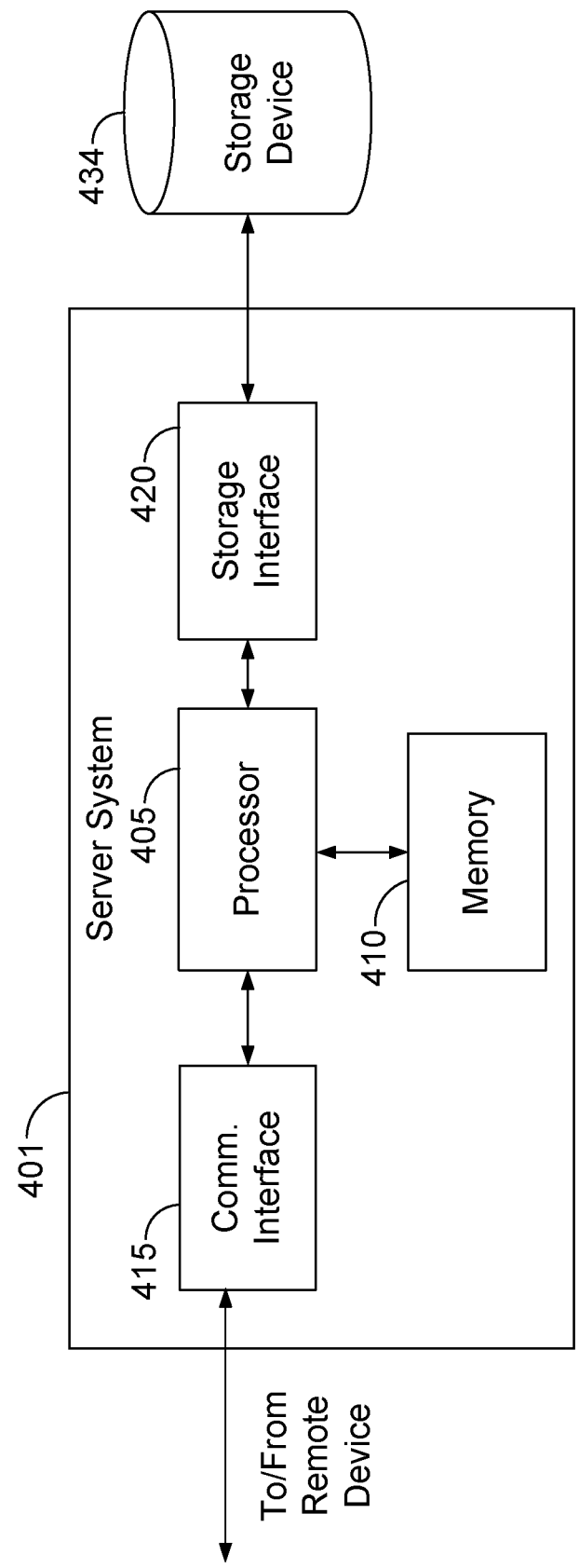

FIG. 4 illustrates an example configuration of a server system 401 such as the server system 112 (shown in FIG. 1) that includes analytics computing device 150 (shown in FIG. 1). Server system 401 may include, but is not limited to, database server 118 (shown in FIG. 1) and/or analytics computing device 150. In some embodiments, server system 401 is similar to server system 112.

Server system 401 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. More specifically, the instructions may cause various data manipulations on data stored in storage device 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 405 is operatively coupled to a communication interface 415 such that server system 401 is capable of communicating with a remote device, such as a user system or another server system 401. For example, communication interface 415 may receive communications from client systems 114 via a plurality of network connections, as illustrated in FIG. 1.

Processor 405 may also be operatively coupled to a storage device 434. Storage device 434 is any computer-operated hardware suitable for storing and/or retrieving data. In some embodiments, storage device 434 is integrated in server system 401. In other embodiments, storage device 434 is external to server system 401 and is similar to database 120 (shown in FIG. 1). For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
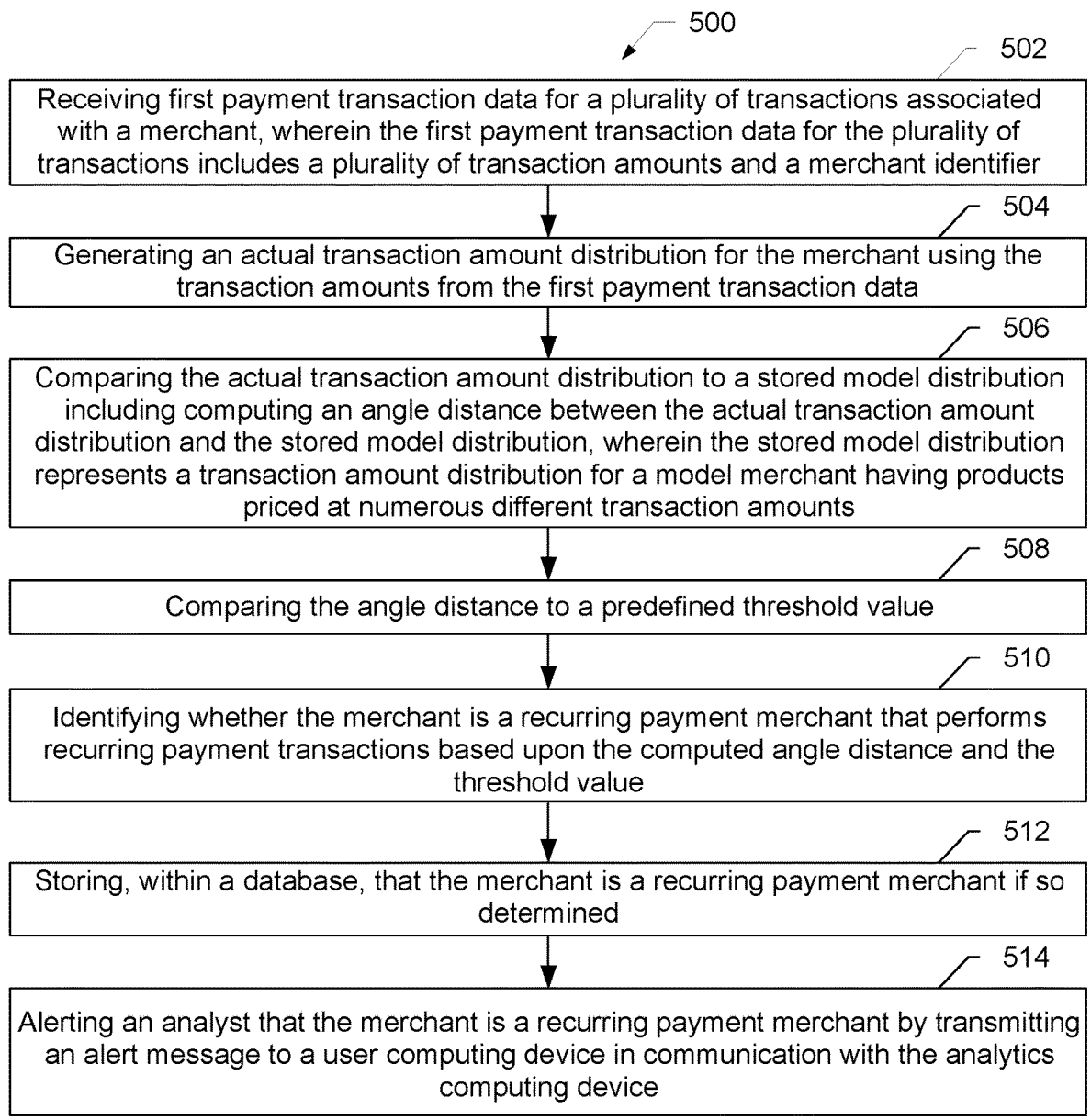

FIG. 5 is a flow diagram of an example method 500 for analyzing payment transaction data to identify merchants having a recurring payment program using a system, such as analytics computing system 100 (shown in FIG. 1). In the example embodiment, method 500 is performed by at least one analytics computing device 150 (shown in FIG. 1). In certain embodiments, method 500 may be at least partially performed by a different computing device. In other embodiments, method 500 may include additional, fewer, or alternative actions, including those described elsewhere herein.

Method 500 includes receiving 502 first payment transaction data for a plurality of transactions associated with a merchant, wherein the first payment transaction data for the plurality of transactions includes a plurality of transaction amounts and a merchant identifier. Method 500 also includes generating 504 an actual transaction amount distribution for the merchant using the transaction amounts from the first payment transaction data and comparing 506 the actual transaction amount distribution to a stored model distribution including computing an angle distance between the actual transaction amount distribution and the stored model distribution, wherein the stored model distribution represents a transaction amount distribution for a model merchant having products priced at numerous different transaction amounts. Method 500 further includes comparing 508 the angle distance to a predefined threshold value, identifying 510 whether the merchant is a recurring payment merchant that performs recurring payment transactions based upon the computed angle distance and the threshold value, storing 512 within a database that the merchant is a recurring payment merchant if so determined, and alerting 514 an analyst that the merchant is a recurring payment merchant by transmitting an alert message to a user computing device in communication with the analytics computing device.

Figure 6:
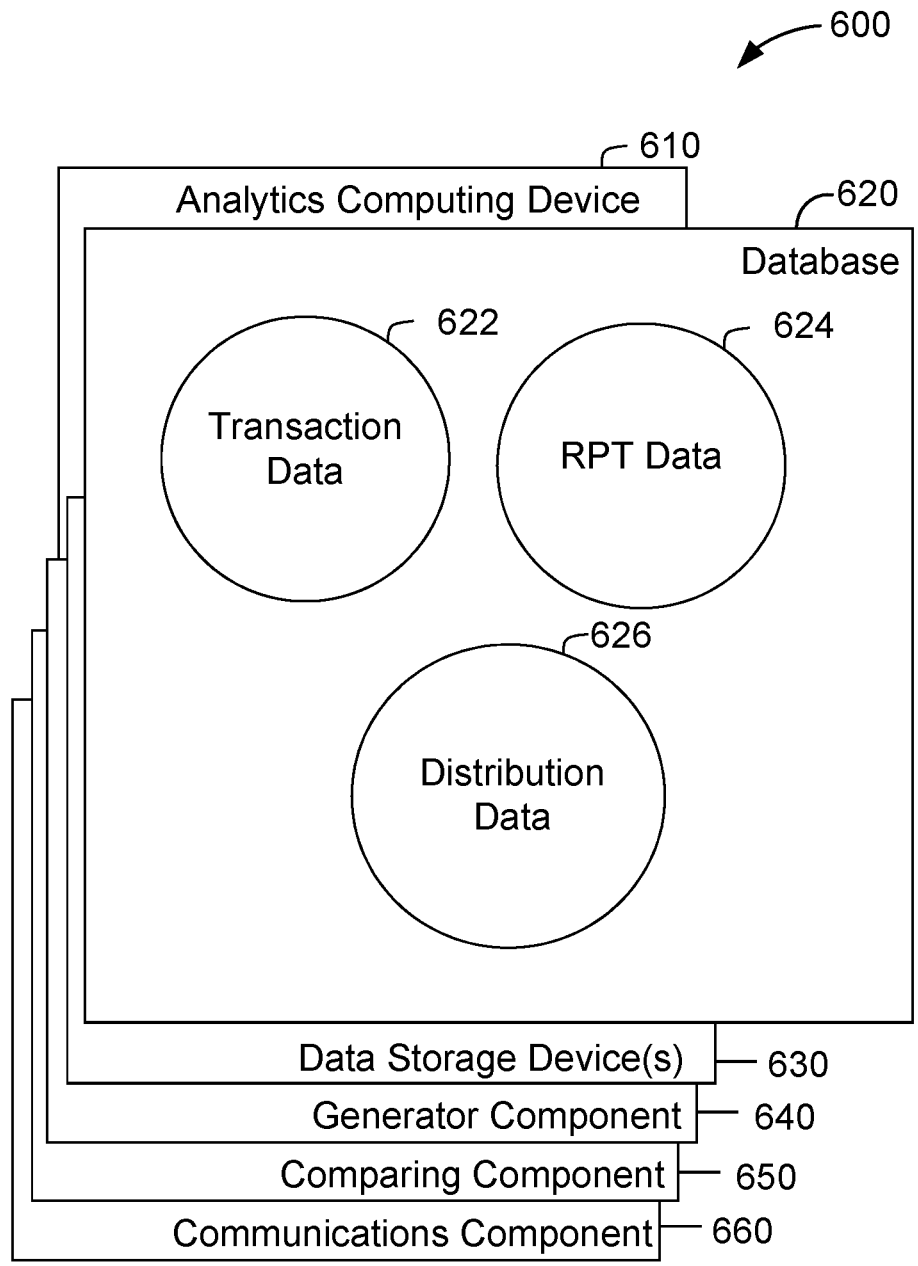

FIG. 6 is a diagram 600 of components of one or more example computing devices that may be used in the method shown in FIG. 5. FIG. 6 further shows a configuration of a distributed database system 620 including at least one database server 118 and database 120, as illustrated in FIG. 1. Database system 620 is coupled to several separate components within analytics computing device 150 (shown in FIG. 1), which perform specific tasks. Analytics computing device is similar to analytics computing device 610.

Analytics computing device 610 includes a data storage device(s) 630 configured to store transaction data 622, RPT data 624, distribution data 626, and other data that may be stored by data storage device(s) to enable computing device 610 to function as described herein. Analytics computing device 610 further includes a generator component 640 configured to generate distributions based upon transaction data 622, RPT data 624, and distribution data 626 and generate merchants lists and fraudulent messages. Analytics computing device 610 also includes a comparing component 650 configured to compare a variety of data including transaction data 622, RPT data 624, and distribution data 626. Analytics computing device 610 further includes a communications component 660 configured to receive transaction data and transmit merchant lists and fraudulent messages to a requestor, such as an issuer bank 230, merchant, 224, and/or user 222, as illustrated in FIG. 2.

In an exemplary embodiment database storage device(s) 630 is divided into a plurality of sections, including but not limited to, a transaction data section 622, a RPT data section 624, and a distribution data section 626. These sections may be separated between databases 118 and 120 (shown in FIG. 1). Databases 118 and 120 are interconnected through analytics computing device 150 to update and retrieve the information as required.

Figure 7:
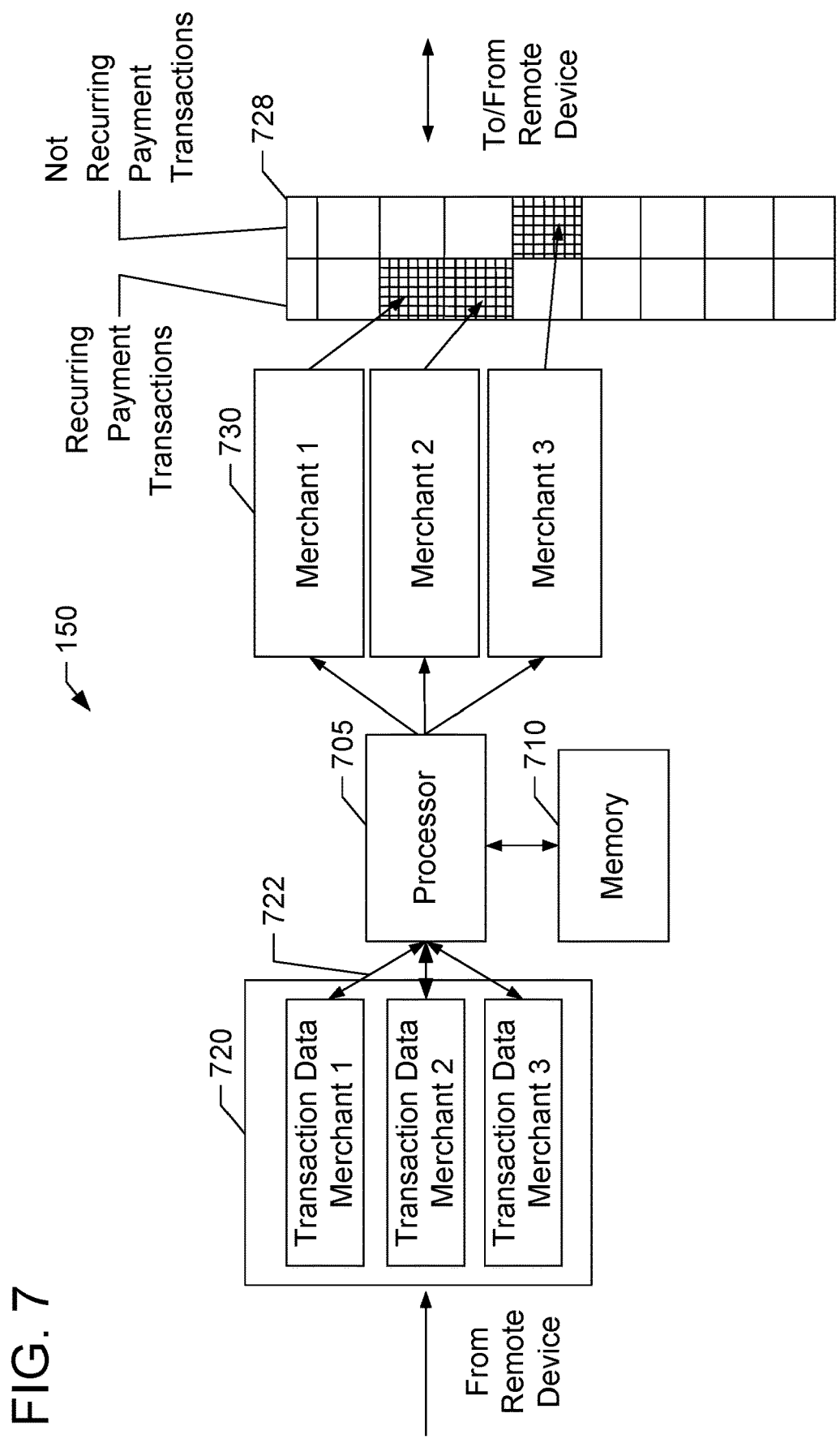

FIG. 7 illustrates an example configuration of an analytics computing device 150 (also shown in FIG. 1) for analyzing payment transaction data to identify merchants having a recurring payment program. Analytics computing device 150 may include, but is not limited to, processor 705 for executing instructions. In some embodiments, processor 705 is similar to processor 405 (shown in FIG. 4). In the example embodiment, analytics computing device 150 includes executable instructions that are stored in a memory area 710. Processor 705 may include one or more processing units, for example, a multi-core configuration. Memory area 710 is any device allowing information such as executable instructions and/or written works to be stored and retrieved. Memory area 710 may include one or more computer readable media.

Analytics computing device 150 includes a processor 705 for executing instructions. Instructions may be stored in a memory area 710, for example. Processor 705 may include one or more processing units (e.g., in a multi-core configuration) for executing instructions. The instructions may be executed within a variety of different operating systems on analytics computing device 150, such as UNIX®, LINUX® (LINUX is a registered trademark of Linus Torvalds), Microsoft Windows®, etc. More specifically, the instructions may cause various data manipulations on recurring payment transactions (RPT) data table 728 (e.g., create, read, update, and delete data). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 705 is operatively coupled to a communication interface (not shown) such that analytics computing device 150 is capable of communicating with a remote device, such as payment processor 110 (shown in FIG. 1). For example, communication interface may receive communications from client systems 114 and/or POS systems 122 via the Internet, as illustrated in FIG. 1.

Processor 705 may also be operatively coupled to a storage device 720. Storage device 720 is any computer-operated hardware suitable for storing and/or retrieving data. In some embodiments, storage device 720 is integrated in analytics computing device 150. In other embodiments, storage device 720 is external to analytics computing device 150 and is similar to storage device 434 (shown in FIG. 4). For example, analytics computing device 150 may include one or more hard disk drives as storage device 434. In other embodiments, storage device 720 is external to analytics computing device 150 and may be accessed by a plurality of analytics computing device 150. For example, storage device 720 may include multiple storage units such as hard disks or solid state disks in a redundant array of inexpensive disks (RAID) configuration. Storage device 720 may include a storage area network (SAN) and/or a network attached storage (NAS) system.

In some embodiments, processor 705 is operatively coupled to storage device 720 via a storage interface 722. Storage interface 722 is any component capable of providing processor 705 with access to storage device 720. Storage interface 722 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 720.

In certain embodiments, processor 705 is configured to instruct analytics computing device 150 to build RPT data table 728 using parsed transaction data that may include payment transactions initiated by user 222 (shown in FIG. 2) using a payment device (e.g., a payment card, digital wallet, mobile payment, etc.) associated with interchange network 228 (shown in FIG. 2). The transaction data may also include, among other data points, data associated with user 222 and merchant 224 (shown in FIG. 2) involved in the payment transaction. For example, transaction data may include one or more of: user account data (e.g., PAN), user biometric data, a merchant identifier, a merchant computing device identifier, a transaction amount, a time and date of the transaction, data descriptive of the purchase, a location of the transaction, and/or other data associated with the payment transaction.

Processor 705 is also configured to instruct analytics computing device 150 to parse transaction data stored within storage device 720, extract the merchant identifier, the user account data, the transaction amount, and the time and date of the transaction to determine whether merchant 224 performs recurring payment transactions. Processor 705 is further configured to instruct analytics computing device 150 to retrieve the leading digits of the transaction amounts, generate an actual distribution using the leading digits, and compare the actual distribution to an expected or theoretical distribution, such as a distribution proposed by Benford's Law, as described in FIG. 1.

Processor 705 is also configured to instruct analytics computing device 150 to use the transaction amount, the user account data, and time and date of the transaction to predict or identify merchants performing recurring payment transactions. More specifically, once analytics computing device 150 has retrieved the parsed data, processor 705 instructs analytics computing device 150 to analyze the transaction amount, the user account data, and time and date of the transaction. Analytics computing device 150 performs the analysis, as described in FIG. 1.

Processor 705 is further configured to instruct analytics computing device 150 to group merchants by merchant category and identify the merchant categories having transaction amount distributions that are dissimilar or similar to the theoretical distribution identified by Benford's Law, as explained above. If the actual distribution of a merchant category is not similar to Benford's Law, processor 705 instructs analytics computing device 150 to assign an indicator in the form of a score to the category, wherein the score indicates how likely a merchant category is to have a recurring payment program. Processor 705 is also configured to instruct analytics computing device 150 to determine that merchant 224 does not perform recurring payment transactions if most transaction dates fall on different dates (e.g., the transaction dates do not follow a normal distribution, such as a bell-curved distribution).

Once analytics computing device 150 has determined whether merchant 224 performs recurring payment transactions, processor 705 instructs analytics computing device 150 to add merchant 224 to RPT data table 728 as performing recurring or not recurring payment transactions. Analytics computing device 150 may add merchant 224 to RPT data table 728 by storing the merchant identifier corresponding to merchant 224 in RPT data table 728. Processor 705 may also instruct analytics computing device 150 to store the transaction data associated with merchant 224 in RPT data table 728. In the example embodiment, analytics computing device 150 may use the identifier corresponding to merchant 224 to store the transaction data associated with merchant 224 in RPT data table 728. The data stored in RPT data table 728 may be referred to as RPT data 730.

In the example embodiment, processor 705 is configured to instruct analytics computing device 150 to build a merchant profile using the data stored in RPT data table 728. This profile may indicate whether merchant 224 performs recurring payment transactions. By determining whether merchant 224 performs recurring payment transactions, analytics computing device 150 is able to identify payment transactions associated with merchant 224 that do not follow the type of payment transactions that merchant 224 usually performs. For example, if analytics computing device 150 determines that merchant 224 performs recurring payment transactions, but a predefined number of payment transactions associated with merchant 224 do not follow one of the models of recurring payment transactions explained above, analytics computing device 150 flags the non-compliant payment transactions as potentially compromised and may transmit a fraud alert regarding the compromised payment transactions to issuer bank 230, merchant 224, and/or user 222.

Processor 705 may also instruct analytics computing device 150 to update RPT data table 728 every time the transaction data associated with a stored merchant identifier is received. Processor 705 may further instruct analytics computing device 150 to transmit to a requestor a list of merchants that perform recurring payment transactions and/or do not perform recurring payment transactions. Additionally or alternatively, processor 705 may be configured to instruct analytics computing device 150 to maintain current records in RPT data table 728. For example, analytics computing device 150 may periodically (e.g., in an hourly and/or daily basis) parse RPT data table 728 to identify outdated records. These records may be in general data that do not represent the type of merchant a merchant is (e.g., performing or not performing recurring payment transactions) and has been stored in RPT data table 728 after a predefined time period.

Memory area 710 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for identifying merchants that perform recurring payment transactions. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the analytics computing device are described herein as including general processing and memory devices, it should be understood that the analytics computing device is a specialized computer configured to perform the steps described herein for analyzing payment transaction data to identify merchants having a recurring payment program.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. An analytics computing system for analyzing payment transaction data to identify merchants having a recurring payment program comprising an analytics computing device, the analytics computing device comprising a processor communicatively coupled to a non-transitory memory, the non-transitory memory storing computer-executable instructions configured to cause the processor to:
   receive first payment transaction data from authorization request messages submitted over an interchange network for a first plurality of transactions associated with a merchant, wherein the first payment transaction data for the first plurality of transactions includes a first plurality of transaction amounts and a merchant identifier;
   generate a first actual transaction amount distribution for the merchant using the first plurality of transaction amounts from the first payment transaction data;
   compare the first actual transaction amount distribution to a stored model distribution including computing an angle distance between the first actual transaction amount distribution and the stored model distribution, wherein the stored model distribution represents a transaction amount distribution for a model merchant having products priced at numerous different transaction amounts;
   compare the angle distance to a predefined threshold value;

determine that the merchant performs recurring payment transactions based upon the computed angle distance and the comparison of the angle distance to the predefined threshold value;

store, in a database table based on the determination, an indicator indicating that the merchant is a recurring payment merchant;

compare, based on the stored indicator, a subsequent transaction amount distribution derived from subsequent authorization request messages submitted over the interchange network by the merchant to at least one stored model of the recurring payment transactions, wherein the subsequent transaction amount distribution is for subsequent transactions that are different from the first plurality of transactions; and transmit a fraud alert message to at least one of the merchant, an issuer, or an analyst in response to the subsequent transaction amount distribution being dissimilar to the at least one stored model, the fraud alert message indicating that at least a set of the subsequent transactions is likely to be fraudulent.

2. The analytics computing system of claim 1, wherein the computer-executable instructions are further configured to cause the processor to:

generate a merchant list including the merchant and a plurality of merchants previously determined as recurring payment merchants; and transmit the merchant list to at least one user computing device associated with a requestor of the merchant list.

3. The analytics computing system of claim 2, wherein the computer-executable instructions are further configured to cause the processor to transmit updated user payment information associated with at least one user to one or more merchants included in the merchant list, the one or more merchants having transacted with the at least one user.

4. The analytics computing system of claim 1 wherein the computer-executable instructions are further configured to cause the processor to:

build a recurring payment transaction (RPT) table using data associated with merchants determined as one of recurring payment merchants and non-recurring payment merchants;

update the RPT table in response to receiving subsequent data associated with the merchants in the RPT table; and periodically prune the RPT table by parsing the RPT table to identify outdated records associated with the merchant in the RPT table.

5. The analytics computing system of claim 1, wherein the computer-executable instructions are further configured to cause the processor to:

receive second payment transaction data for a second plurality of transactions associated with the merchant, wherein the second plurality of transactions are different from the first plurality of transactions and the second payment transaction data is different from the first payment transaction data, and wherein the second payment transaction data includes at least a second plurality of transaction amounts, a plurality of transaction timestamps, at least one merchant category, and the merchant identifier, the second payment transaction data received from the interchange network in communication with the analytics computing device;

generate a second actual transaction amount distribution for the merchant using the second plurality of transaction amounts from the second payment transaction data;

compare the second actual transaction amount distribution to the first actual transaction amount distribution for the merchant;

determine whether the second actual transaction amount distribution is dissimilar to the first actual transaction amount distribution for the merchant;

generate an additional fraud alert message if the second actual transaction amount distribution is determined to be dissimilar to the first actual transaction amount distribution for the merchant; and transmit the additional fraud alert message to at least one of the merchant, the issuer, or the analyst advising that the merchant has likely experienced fraudulent transactions included in the second plurality of transactions.

6. The analytics computing system of claim 1, wherein the computer-executable instructions are further configured to cause the processor to extract a leading number from each of the first plurality of transaction amounts to generate the first actual transaction amount distribution.

7. The analytics computing system of claim 6, wherein the computer-executable instructions are further configured to cause the processor to:

calculate a percentage that the leading number occurs in the first actual transaction amount distribution;

match the leading number to a corresponding number of the stored model distribution, wherein the matching includes comparing the calculated percentage to a percentage of the corresponding number, and wherein the stored model distribution is a Benford's Law distribution; and determine that the merchant performs the recurring payment transactions when the comparison satisfies the predefined threshold value.

8. The analytics computing system of claim 1, wherein the computer-executable instructions are further configured to cause the processor to:

receive second payment transaction data for a second plurality of transactions associated with a second merchant;

calculate a number of times each second transaction amount of the second plurality of transactions is included in an actual transaction amount distribution for the second merchant;

identify a transaction amount distribution mode of the actual transaction amount distribution for the second merchant, wherein the transaction amount distribution mode is the second transaction amount occurring most times in the actual transaction amount distribution for the second merchant;

compare the transaction amount distribution mode to a corresponding number of the stored model distribution; and determine that the second merchant does not perform the recurring payment transactions in response to the transaction amount distribution mode being the same as the corresponding number of the stored model distribution.

9. The analytics computing system of claim 1, wherein the computer-executable instructions are further configured to cause the processor to:

generate a timestamp distribution using a plurality of timestamps from a merchant profile, wherein the merchant profile includes the plurality of timestamps;

calculate a number of times each timestamp of the plurality of timestamps is in the timestamp distribution;

identify a timestamp distribution mode of the timestamp distribution;

compare the number of times the timestamp distribution mode is included in the timestamp distribution to the number of times each timestamp is included in the timestamp distribution; and determine that the merchant performs the recurring payment transactions when the comparison satisfies the predefined threshold value.

10. A computer-implemented method for analyzing payment transaction data to identify merchants having a recurring payment program, said method implemented using an analytics computing device including a processor in communication with a non-transitory memory storing computer-executable instructions embodied thereon, said method comprising:

receiving first payment transaction data from authorization request messages submitted over an interchange network for a first plurality of transactions associated with a merchant, wherein the first payment transaction data for the first plurality of transactions includes a first plurality of transaction amounts and a merchant identifier;

generating a first actual transaction amount distribution for the merchant using the first plurality of transaction amounts from the first payment transaction data;

comparing the first actual transaction amount distribution to a stored model distribution including computing an angle distance between the first actual transaction amount distribution and the stored model distribution, wherein the stored model distribution represents a transaction amount distribution for a model merchant having products priced at numerous different transaction amounts;

comparing the angle distance to a predefined threshold value;

determining that the merchant performs recurring payment transactions based upon the computed angle distance and the comparison of the angle distance to the predefined threshold value;

storing, in a database table based on the determination, an indicator indicating that the merchant is a recurring payment merchant;

comparing, based on the stored indicator, a subsequent transaction amount distribution derived from subsequent authorization request messages submitted over the interchange network by the merchant to at least one stored model of the recurring payment transactions, wherein the subsequent transaction amount distribution is for subsequent transactions that are different from the first plurality of transactions; and transmitting a fraud alert message to at least one of the merchant, an issuer, or an analyst in response to the subsequent transaction amount distribution being dissimilar to the at least one stored model, the fraud alert message indicating that at least a set of the subsequent transactions is likely to be fraudulent.

11. The method of claim 10 further comprising:
generating a merchant list including the merchant and a plurality of merchants previously determined as recurring payment merchants; and transmitting the merchant list to at least one user computing device associated with a requestor of the merchant list.

12. The method of claim 11 further comprising transmitting updated user payment information associated with at least one user to one or more merchants included in the merchant list, the one or more merchants having transacted with the at least one user.

13. The method of claim 10 further comprising:
building a recurring payment transaction (RPT) table using data associated with merchants determined as one of recurring payment merchants and non-recurring payment merchants;

updating the RPT table in response to receiving subsequent data associated with the merchants in the RPT table; and periodically pruning the RPT table by parsing the RPT table to identify outdated records associated with the merchant in the RPT table.

14. The method of claim 10 further comprising:
receiving second payment transaction data for a second plurality of transactions associated with the merchant, wherein the second plurality of transactions are different from the first plurality of transactions and the second payment transaction data is different from the first payment transaction data, and wherein the second payment transaction data includes at least a second plurality of transaction amounts, a plurality of transaction timestamps, at least one merchant category, and the merchant identifier, the second payment transaction data received from the interchange network in communication with the analytics computing device;

generating a second actual transaction amount distribution for the merchant using the second plurality of transaction amounts from the second payment transaction data;

comparing the second actual transaction amount distribution to the first actual transaction amount distribution for the merchant;

determining whether the second actual transaction amount distribution is dissimilar to the first actual transaction amount distribution for the merchant;

generating an additional fraud alert message if the second actual transaction amount distribution is determined to be dissimilar to the first actual transaction amount distribution for the merchant; and transmitting the additional fraud alert message to at least one of the merchant, the issuer, or the analyst advising that the merchant has likely experienced fraudulent transactions included in the second plurality of transactions.

15. The method of claim 10 further comprising extracting a leading number from each of the first plurality of transaction amounts to generate the first actual transaction amount distribution.

16. The method of claim 15, wherein determining whether the merchant is the recurring payment merchant further comprises:

calculating a percentage that the leading number occurs in the first actual transaction amount distribution;

matching the leading number to a corresponding number of the stored model distribution, wherein the matching includes comparing the calculated percentage to a percentage of the corresponding number, and wherein the stored model distribution is a Benford's Law distribution; and determining that the merchant performs the recurring payment transactions when the comparison satisfies the predefined threshold value.

17. One or more non-transitory computer-readable storage media having computer-executable instructions embodied thereon, wherein when executed by an analytics computing device having at least one processor coupled to at least one non-transitory memory device, the computer-executable instructions cause the at least one processor to:

receive first payment transaction data from authorization request messages submitted over an interchange network for a first plurality of transactions associated with a merchant, wherein the first payment transaction data for the first plurality of transactions includes a first plurality of transaction amounts and a merchant identifier;

generate a first actual transaction amount distribution for the merchant using the first plurality of transaction amounts from the first payment transaction data;

compare the first actual transaction amount distribution to a stored model distribution including computing an angle distance between the first actual transaction amount distribution and the stored model distribution, wherein the stored model distribution represents a transaction amount distribution for a model merchant having products priced at numerous different transaction amounts;

compare the angle distance to a predefined threshold value;

determine that the merchant performs recurring payment transactions based upon the computed angle distance and the comparison of the angle distance to the predefined threshold value;

store, in a database table based on the determination, an indicator indicating that the merchant is a recurring payment merchant;

compare, based on the stored indicator, a subsequent transaction amount distribution derived from subsequent authorization request messages submitted over the interchange network by the merchant to at least one stored model of the recurring payment transactions, wherein the subsequent transaction amount distribution is for subsequent transactions that are different from the first plurality of transactions; and transmit a fraud alert message to at least one of the merchant, an issuer, and an analyst in response to the subsequent transaction amount distribution being dissimilar to the at least one stored model, the fraud alert message indicating that at least a set of the subsequent transactions is likely to be fraudulent.

18. The non-transitory computer-readable storage media of claim 17, wherein the computer-executable instructions further cause the at least one processor to:
generate a merchant list including the merchant and a plurality of merchants previously determined as recurring payment merchants; and
transmit the merchant list to at least one user computing device associated with a requestor of the merchant list.

19. The non-transitory computer-readable storage media of claim 17, wherein the computer-executable instructions further cause the at least one processor to extract a leading number from each of the first plurality of transaction amounts to generate the first actual transaction amount distribution.

20. The non-transitory computer-readable storage media of claim 19, wherein the computer-executable instructions further cause the at least one processor to:
calculate a percentage that the leading number occurs in the first actual transaction amount distribution;
match the leading number to a corresponding number of the stored model distribution, wherein the matching includes comparing the calculated percentage to a percentage of the corresponding number, and wherein the stored model distribution is a Benford's Law distribution; and
determine that the merchant performs the recurring payment transactions when the comparison satisfies the predefined threshold value.

\* \* \* \* \*